(12) United States Patent
Rule et al.

(10) Patent No.: US 11,556,668 B2
(45) Date of Patent: Jan. 17, 2023

(54) SYSTEM AND METHOD FOR DYNAMIC GENERATION OF URL BY SMART CARD

(71) Applicant: Capital One Services, LLC, McLean, VA (US)

(72) Inventors: Jeffrey Rule, Chevy Chase, MD (US); Wayne Lutz, Fort Washington, MD (US); Paul Moreton, Glen Allen, VA (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 15 days.

(21) Appl. No.: 16/930,648

(22) Filed: Jul. 16, 2020

(65) Prior Publication Data

US 2020/0349279 A1    Nov. 5, 2020

Related U.S. Application Data

(63) Continuation of application No. 16/034,229, filed on Jul. 12, 2018, now Pat. No. 10,769,299.

(51) Int. Cl.
*G06F 21/00* (2013.01)
*G06F 21/62* (2013.01)
*H04L 9/40* (2022.01)
*G06K 19/07* (2006.01)

(52) U.S. Cl.
CPC ..... *G06F 21/6245* (2013.01); *G06K 19/0723* (2013.01); *H04L 63/083* (2013.01); *H04L 63/0861* (2013.01)

(58) Field of Classification Search
CPC ............ G06F 21/6245; G06K 19/0723; H04L 63/083; H04L 63/0861
See application file for complete search history.

(56) References Cited

U.S. PATENT DOCUMENTS

| | | | |
|---|---|---|---|
| 6,058,373 A | 5/2000 | Blinn et al. |
| 6,199,762 B1 | 3/2001 | Hohle |
| 6,342,844 B1 | 1/2002 | Rozin |
| 6,829,711 B1 | 12/2004 | Kwok et al. |
| 6,834,271 B1 | 12/2004 | Hodgson et al. |

(Continued)

FOREIGN PATENT DOCUMENTS

| | | |
|---|---|---|
| GB | 2 457 221 | 12/2009 |
| WO | 00/49586 | 8/2000 |

OTHER PUBLICATIONS

Notification of Transmittal of the International Search Report and the Written Opinion of the International Searching Authority issued in PCT/US2019/041217, dated Aug. 1, 2019.

(Continued)

*Primary Examiner* — Mahfuzur Rahman
(74) *Attorney, Agent, or Firm* — Hunton Andrews Kurth LLP

(57) ABSTRACT

Embodiments of a smart card and systems and methods for secure data access using a smart card are described. The smart card may be formed a substrate and may include a microprocessor, a memory containing an applet, a counter, and a unique identifier. The smart card may dynamically generate a unique uniform resource location (URL) and transmit the URL to via a contactless communication interface to securely facilitate data access from other devices.

20 Claims, 8 Drawing Sheets

(56) References Cited

U.S. PATENT DOCUMENTS

| | | |
|---|---|---|
| 6,877,656 B1 | 4/2005 | Jaros et al. |
| 7,128,274 B2 | 10/2006 | Kelley et al. |
| 7,165,727 B2 | 1/2007 | de Jong |
| 7,232,073 B1 | 6/2007 | de Jong |
| 7,246,752 B2 | 6/2007 | Brown |
| 7,319,986 B2 | 1/2008 | Praisner et al. |
| 7,374,099 B2 | 5/2008 | de Jong |
| 7,584,153 B2 | 9/2009 | Brown et al. |
| 7,793,851 B2 | 9/2010 | Mullen |
| 7,922,082 B2 | 4/2011 | Muscato |
| 8,196,131 B1 | 6/2012 | von Behren et al. |
| 8,302,872 B2 | 11/2012 | Mullen |
| 8,332,272 B2 | 12/2012 | Fisher |
| 8,365,988 B1 | 2/2013 | Medina, III et al. |
| 8,567,670 B2 | 10/2013 | Stanfield et al. |
| 8,615,468 B2 | 12/2013 | Varadarajan |
| 8,750,514 B2* | 6/2014 | Gallo .................. G06Q 10/10 709/219 |
| 2001/0029485 A1 | 10/2001 | Brody et al. |
| 2001/0034702 A1 | 10/2001 | Mockett et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2006/0136334 A1 | 6/2006 | Atkinson et al. |
| 2006/0173985 A1 | 8/2006 | Moore |
| 2007/0061266 A1 | 3/2007 | Moore et al. |
| 2007/0061487 A1 | 3/2007 | Moore et al. |
| 2008/0035738 A1 | 2/2008 | Mullen |
| 2008/0071681 A1 | 3/2008 | Khalid |
| 2008/0308641 A1 | 12/2008 | Finn |
| 2010/0023455 A1 | 6/2010 | Dispensa et al. |
| 2011/0101093 A1 | 5/2011 | Ehrensvard |
| 2011/0153437 A1 | 6/2011 | Archer et al. |
| 2012/0178366 A1 | 7/2012 | Levy et al. |
| 2012/0207305 A1* | 8/2012 | Gallo .................. H04L 61/00 380/271 |
| 2013/0104251 A1 | 4/2013 | Moore et al. |
| 2013/0171929 A1 | 7/2013 | Adams et al. |
| 2014/0214674 A1 | 7/2014 | Narula |
| 2015/0332266 A1 | 11/2015 | Friedlander et al. |
| 2015/0371453 A1 | 12/2015 | Gallo et al. |
| 2016/0012465 A1 | 1/2016 | Sharp |
| 2016/0048913 A1 | 2/2016 | Rausaria et al. |
| 2016/0335531 A1 | 11/2016 | Mullen et al. |
| 2017/0004502 A1 | 1/2017 | Quentin et al. |
| 2017/0011395 A1* | 1/2017 | Pillai .................. G06Q 20/3227 |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0103388 A1* | 4/2017 | Pillai .................. G06Q 20/382 |
| 2017/0116447 A1* | 4/2017 | Cimino .............. H04L 63/0442 |
| 2017/0140379 A1 | 5/2017 | Deck |
| 2017/0330173 A1 | 11/2017 | Woo et al. |
| 2018/0039986 A1 | 2/2018 | Essebag et al. |
| 2018/0068316 A1 | 3/2018 | Essebag et al. |
| 2018/0160255 A1* | 6/2018 | Park ....................... H04L 67/02 |
| 2018/0181927 A1 | 6/2018 | Stoeger |
| 2019/0014107 A1 | 1/2019 | George |
| 2019/0019375 A1* | 1/2019 | Foley ................ G06Q 20/3278 |
| 2019/0205244 A1 | 6/2019 | Smith |
| 2019/0363746 A1 | 11/2019 | Zalewski et al. |

OTHER PUBLICATIONS

Notification Concerning Transmittal of International Preliminary Report on Patentability from related Application No. PCT/US2019/041217 dated Jan. 21, 2021.

European Extended Search Report issued in related European Patent Application No. EP 19834075.4, dated Feb. 17, 2022.

Indian Patent Office Examination Report issued in related Indian Patent Application No. 202127003897 dated Oct. 31, 2022.

Intellectual Property Office of Singapore Search Report and Written Opinion issued in related Singapore Patent Application No. 11202100304T dated Nov. 1, 2022.

* cited by examiner

Smart Card (100)

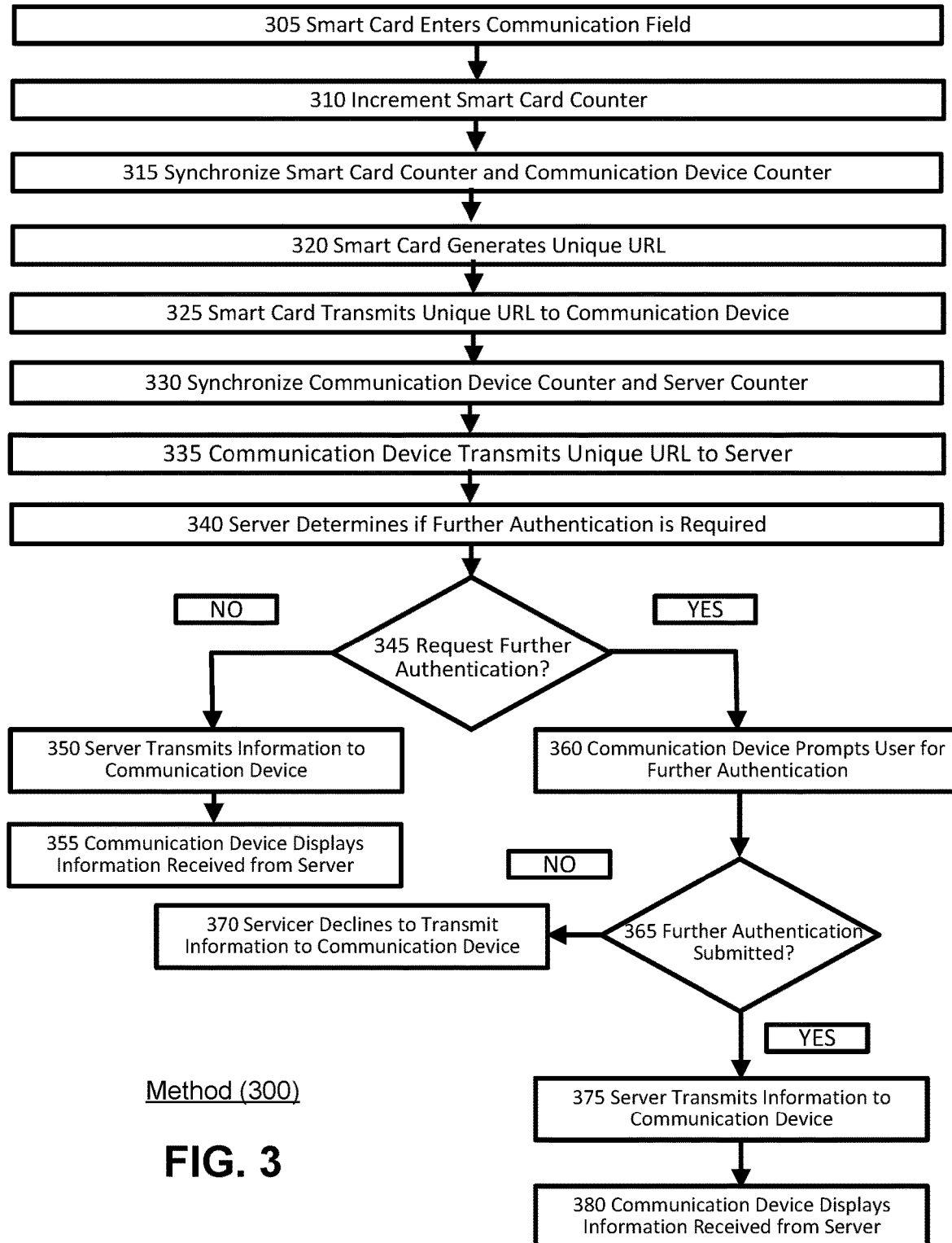

Account Interface 450

Application
User Interface (400)

Authentication Interface 510
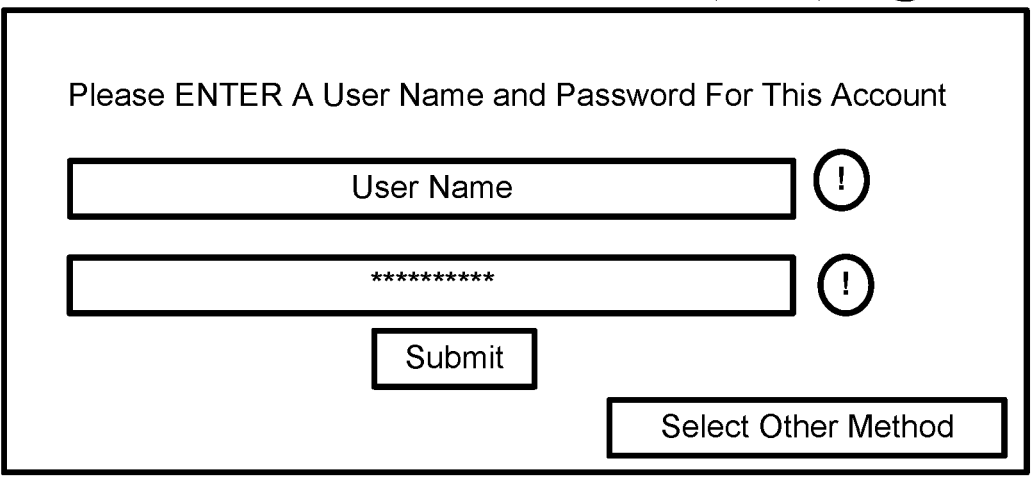
Account Interface 520
Web Browser
User Interface (500)
FIG. 5

SYSTEM AND METHOD FOR DYNAMIC GENERATION OF URL BY SMART CARD

CROSS REFERENCE TO RELATED APPLICATION

The subject application is a continuation of U.S. patent application Ser. No. 16/034,229 filed Jul. 12, 2019, the contents of which is hereby incorporated by reference in its entirety.

FIELD OF THE INVENTION

This disclosure relates to smart cards, and more specifically, to systems and methods for the dynamic generation of uniform resource locators by smart cards.

BACKGROUND

Consumers are increasingly adopting electronic payment methods, such as credit cards and debit cards, for purchases. Consumers will commonly carry at least one credit or debit card, and often consumers carry more than one. Consumers may prefer to use credit or debit cards for reasons of convenience, to earn rewards based on spending, to simplify budgeting through the receipt of a monthly statement, or to avoid carrying large amounts of cash. In many areas, credit or debit card transactions outnumber cash transactions.

At the same time, the widespread use of communication devices, such as smart phones, smart watches, laptop computers, and tablets, make data increasingly accessible, including financial information such as account balances and purchase activity. The availability of these devices creates expectations for consumers that their data will be easily accessible at home, outside the home, and on mobile devices.

In view of these trends, data security is increasingly important in many areas, and protecting financial or other sensitive data is a particular concern. Despite large investments in developing, implementing, and maintain security measures, data theft and fraud causes millions, if not billions, of losses annually. Any organization handling sensitive data, financial or otherwise, incurs data security costs and risks liability for theft or other losses due to breaches of data security. In addition to monetary costs, data security breaches erode user confidence in a business, and a large or otherwise notable breach often attracts significant public attention.

Accordingly, there are significant, and competing, needs to safeguard sensitive data while ensuring ready access by authorized users.

SUMMARY

Therefore, it is an object of this disclosure to describe a smart card that enhances the security of data while promoting accessibility. Various embodiments provide a smart card and systems and methods incorporating a smart card, proximate communication devices, and remote servers.

Embodiments of the present disclosure provide a smart card comprising a substrate; a memory embedded in the substrate, wherein the memory contains an applet, a counter, and a unique customer identifier, a contactless communication interface embedded in the substrate; and a microprocessor embedded in the substrate, wherein the microprocessor is in data communication with the memory and the contactless communication interface, wherein, upon entry of the contactless communication interface into a communication field of a communication device, the microprocessor increments the counter and synchronizes the value of the counter with a second counter stored in the communication device, and wherein the applet generates a unique uniform resource locator (URL) based on the incremented value of the counter and the unique customer identifier, and wherein the unique URL is transmitted to the communication device via the contactless communication interface.

Embodiments of the present disclosure provide a system for the secure access of information, comprising a server containing financial information; a smart card including a microprocessor, a contactless communication interface, and a memory storing an applet, a counter, and a unique customer identifier; and a communication device having a communication field, wherein upon entry of the contactless communication interface into the communication field the microprocessor is configured to increment a value stored in the counter and synchronize the incremented counter value with the communication device, the applet is configured to generate a unique URL based on the incremented value of the counter and the unique customer identifier, and the contactless communication interface is configured to transmit the URL to the communication device; and wherein upon receipt of the unique URL, the communication device opens the URL to display financial information received from the server.

Embodiments of the present disclosure provide a method of accessing of information, the method comprising bringing a smart card containing a contactless communication interface, a microprocessor, and a memory storing an applet, a counter, and a unique customer identifier, into the communication field of a communication device; incrementing a value stored in the counter and synchronizing the value with a counter contained in the communication device; generating a unique URL based on the incremented counter value and the unique customer identifier; transmitting the unique URL to the communication device via the contactless communication interface; synchronizing the value of the counter contained in the communication device with a server containing financial information; appending location information relating to the communication device to the unique URL; and transmitting the unique URL to the server.

BRIEF DESCRIPTION OF THE DRAWINGS

FIG. 3 illustrates an example embodiment of a method of providing secure data access using a smart card.

FIG. 5 illustrates an example embodiment of authentication and information user interfaces displayed on a web browser.

DETAILED DESCRIPTION

One aspect of the present disclosure is to provide a smart card that dynamically generates uniform resource locators and systems and methods using smart cards to provide convenient and secure access to account data.

Figure 1A:
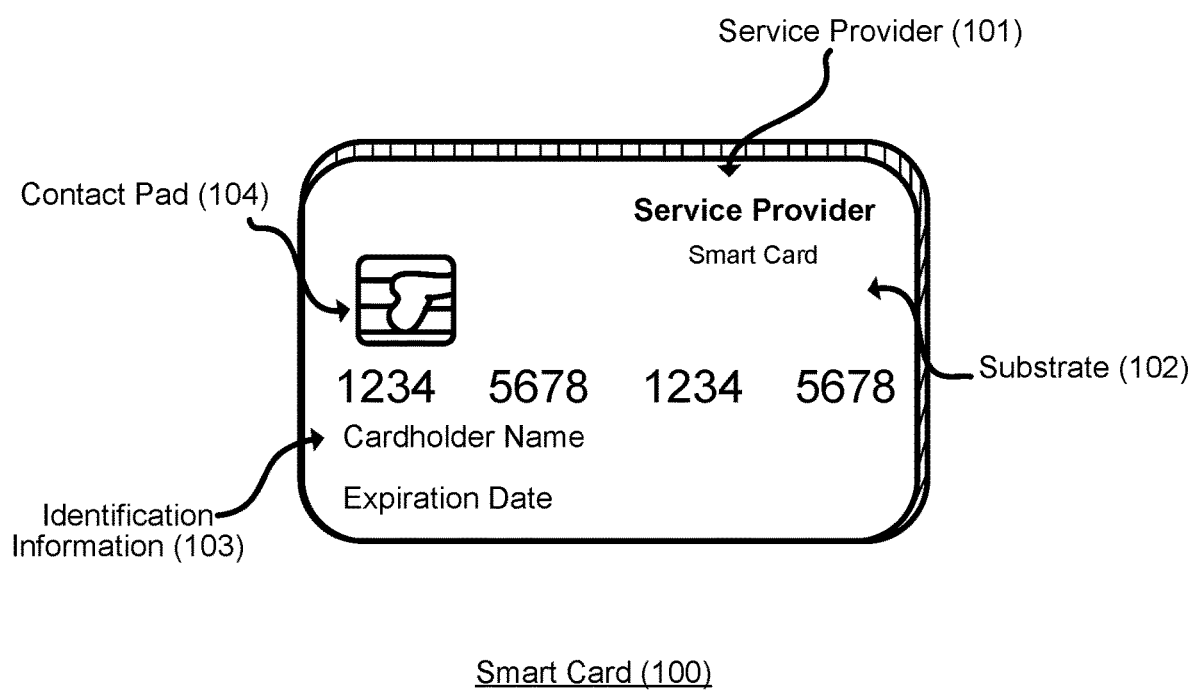
FIG. 1A illustrates an example embodiment of a smart card.

FIG. 1A illustrates a smart card 100 according to an example embodiment. In this embodiment, the smart card 100 may be a payment card, such as a credit card, debit card, or gift card, issued by a service provider 101 displayed on the front or back of the smart card 100. The smart card 100 may be formed of a substrate 102, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In an embodiment, the smart card 100 may have physical characteristics compliant with the ID-1 format of the ISO/IEC 7810 standard, and the smart card 100 may otherwise be compliant with the ISO/IEC 14443 standard. However, it is understood that a smart card according to the present disclosure may have different characteristics, and the present disclosure does not require a smart card to be implemented in a payment card.

The smart card 100 may also include identification information 103 displayed on the front and/or back of the card, and a contact pad 104. The contact pad 104 may establish contact with another communication device, such as a smart phone, laptop, desktop, or tablet computer. The smart card 100 may also include processing circuitry, antenna and other components not shown in FIG. 1A. These components may be located behind the contact pad 104 or elsewhere on the substrate 102. The smart card 100 may also include a magnetic strip or tape, which may be located on the back of the card (not shown in FIG. 1A).

Figure 1B:
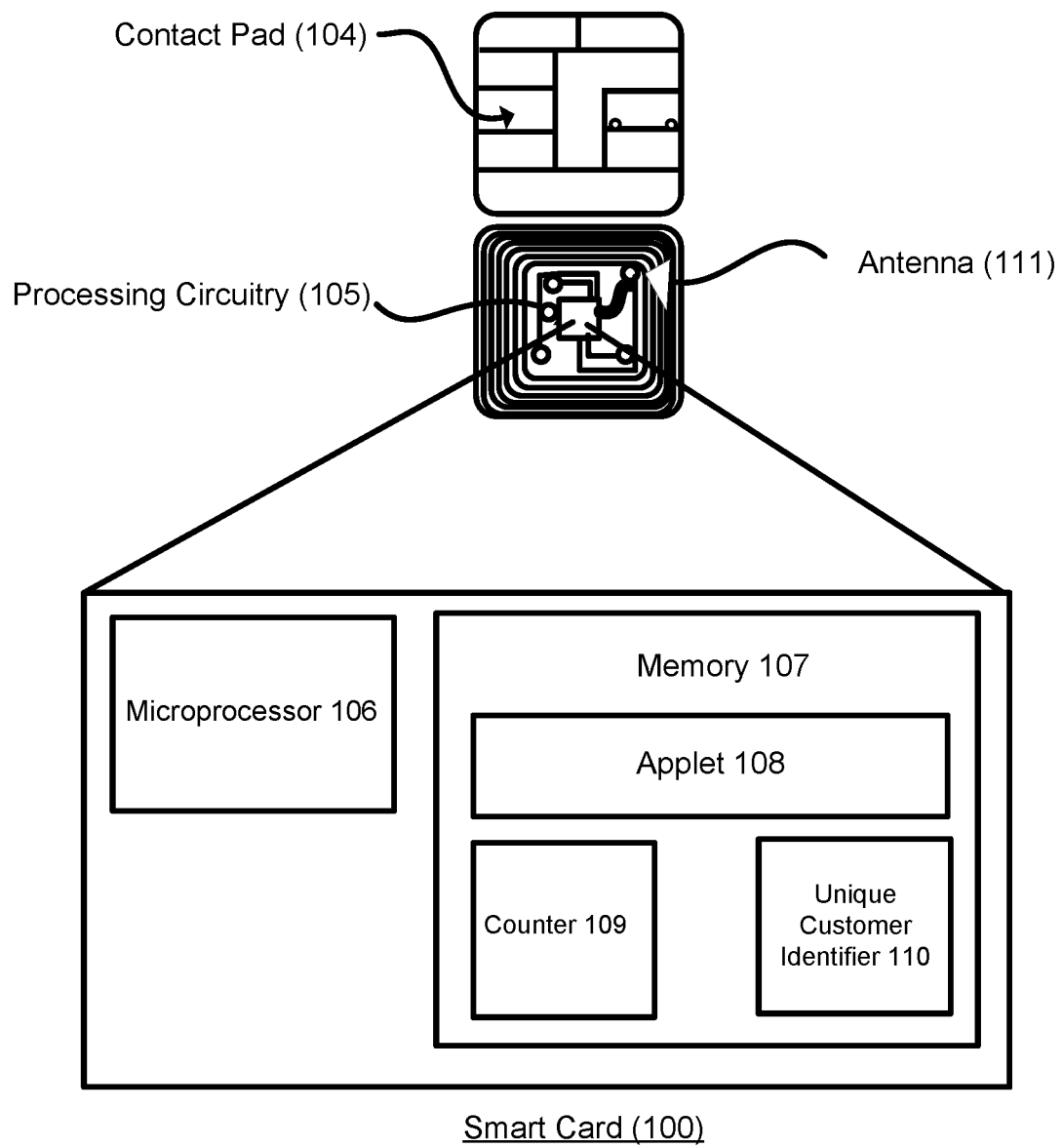
FIG. 1B illustrates an example embodiment of a contact pad of the smart card of FIG. 1A.

FIG. 1B illustrates an exploded view of the contact pad 104 of smart card 100 according to an example embodiment. As shown in FIG. 1B, the contact pad 104 may include processing circuitry 105 for storing and processing information, including a microprocessor 106 and a memory 107. It is understood that the processing circuitry 105 may contain additional components, including processors, memories, error and parity/CRC checkers, data encoders, anticollision algorithms, controllers, command decoders, security primitives and tamperproofing hardware, as necessary to perform the functions described herein.

The memory 107 may be a read-only memory, write-once read-multiple memory or read/write memory, e.g., RAM, ROM and EEPROM, and a smart card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 107 may store an applet 108, a counter 109, and a customer identifier 110. The applet 108 may be a software application intended to execute on smart cards, such as Java Card applet. However, it is understood that the applet is not limited to Java Card applets, and instead may be any software application operable on smart cards or other devices having limited memory. The counter 109 may be a numeric counter sufficient to store an integer. The customer identifier 110 may be a unique alphanumeric identifier assigned to the user of the smart card, and this identifier may distinguish the user of the smart card from all other smart card users. In an embodiment, the customer identifier 110 may identify both the customer and an account assigned to that customer and may further identify the specific smart card 101 associated with the customer's account.

The memory 107 may be divided into several zones, with each zone having a different level of security. The microprocessor 106 may keep track of which memory addresses belong to which zones and the circumstances under which each zone may be accessed. In an example embodiment, the memory 107 may be divided into four zones: a secret zone, a confidential zone, a usage zone, and a public zone.

A secret zone may be used for storage of information which may be used only by the microprocessor 106, e.g., passwords, cryptographic keys. The information stored in this zone is not readable outside of the smart card. In an embodiment, the secret zone may be implemented with a separate processor that is capable of performing cryptographic functions. Cryptographic keys may be passed in to the secret zone or may be generated in the secret zone, and in either case the keys may be stored in the secret zone and used to support cryptographic services. If necessary, cryptographic keys may be exported from the secret zone.

A confidential zone may be used to store a list of all transactions made with the card. The confidential zone may have password protection. In an example embodiment, the password is known only to the card issuer, who may examine the history of the card for evidence of misuse of the system. The confidential zone may have a read-only access restriction so that the information stored in this zone could not be modified, e.g., transaction list could not be modified. In another embodiment, the applet 108 and any associated memory may be firewalled from other applets stored on the smart card 100. In this embodiment, the applet 108 may handle the sending or receiving of any information.

A usage zone could be used for storage of information which may be periodically updated or modified. Depending on the sensitivity of the data, a password may be implemented for this zone. The usage zone may have both read and write access protected by a password. In an embodiment, the unique URL generated by the smart card may be stored in the usage zone of the memory 107.

A public zone may be used for keeping nonsensitive information, such as the card issuer's name and address, or the counter 109. The public zone may have read-only access, without a password.

The processor and memory elements of the foregoing exemplary embodiments are described with reference to the contact pad, but the present disclosure is not limited thereto. It is understood that these elements may be implemented outside of the pad or entirely separate from it, or as further elements in addition to processor and memory elements located within the contact pad.

As shown in FIG. 1B, the smart card 100 may include an antenna 111. The antenna 111 may be placed within the smart card 100 and around the processing circuitry 105 of the contact pad 104. For example, the antenna 111 may be integral with the processing circuitry and the antenna 111 may be used with an external booster coil. As another example, the antenna 111 may be external to the contact pad 104 and the processing circuitry 105.

In an embodiment, the coil of smart card 100 may act as the secondary of an air core transformer. The terminal may communicate with the smart card 100 by cutting power or amplitude modulation. The smart card 100 may infer the data transmitted from the terminal using the gaps in the smart card's power connection, which may be functionally maintained through capacitors. The smart card 100 may communicate back by switching a load on the smart card's coil or load modulation. Load modulation may be detected in the terminal's coil through interference.

Figure 2:
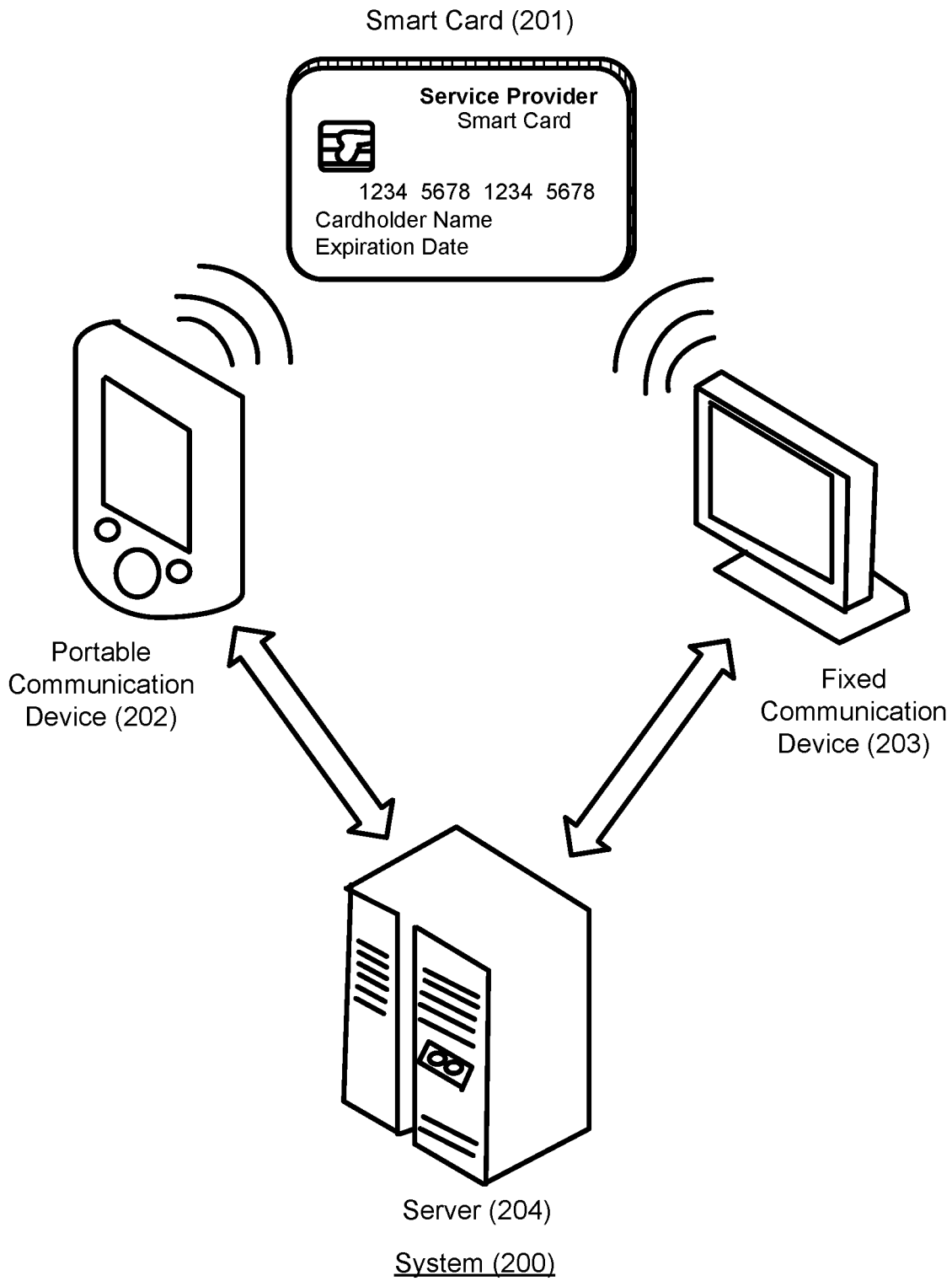
FIG. 2 illustrates an example embodiment of a system for secure data access using a smart card.

FIG. 2 illustrates a system for secure data access using a smart card according to an example embodiment. As shown in FIG. 2, the system 200 may include a smart card 201, a portable communication device 202, a fixed communication device 203, and a server 204. In an embodiment, the smart card 201 may be the same as the smart card 100 described with reference to FIGS. 1A and 1B.

The portable communication device 202 may include a microprocessor, a memory, a contactless communication interface having a communication field (not shown in FIG. 2), and a display. The portable communication device 202 may also include means for receiving user input, such as a keypad, touch screen, voice command recognition, a stylus, and other input/output devices, and the display may be any type of display screen, including an LCD or LED display. Exemplary portable communication devices include, without limitation, smartphones, laptop computers, tablet computers, a personal digital assistant, a palmtop computer, or other portable computing device.

The portable communication device 202 may include a software application related to or affiliated with the smart card 201 and/or a web browser to view data received from the network connection. The software application or web browser may be configured to operate on a portable device. The contactless communication interface may be any short-range wireless communication interface, such as near field communication (NFC) and radio-frequency identification (RFID). In an embodiment, the contactless communication interface may be a NFC interface compliant with the ISO 18092/ECMA-340. This contactless communication interface may allow data communication with the smart card 201, when the smart card 201 is within the interface's communication field. When the smart card 201 is within data communication range of the portable communication device 202, the smart card 201 may synchronize the value of the counter stored in its memory with the counter stored by the portable communication device 202, and further, the smart card 201 may transmit a unique URL to the portable communication device 202.

The portable communication device 202 may have data connectivity to a network, such as the Internet, via a wireless communication network, a cellular network, a wide area network, a local area network, a wireless personal area network, a wide body area network, or the like, or any combination thereof. Through this connectivity, the portable communication device 202 may communicate with a server 204. For example, the portable communication device 202 may synchronize the counter stored in its memory with the server 204, and may transmit the unique URL received from the smart card 201 to the server 204 (e.g., the portable communication device 202 may open the unique URL in a web browser or software application). Upon receipt of the unique URL, the server 204 may send financial or other information to the smart card 201.

Fixed communication device 203 may include a microprocessor, a memory, a contactless communication interface having a communication field (not shown in FIG. 2), and a display. The fixed communication device 203 may also include means for receiving user input, such as a keypad, touch screen, voice command recognition, a stylus, and other input/output devices, and the display may be any type of display screen, including an LCD or LED display. Exemplary fixed communication devices include, without limitations, desktop computers, a cash register, a kiosk, a checkout machine, an automated teller machine (ATM), an information station, a booth, an ordering station, a map or general information display, and a countertop computer display, as well as laptop computers, tablets, and other computing hardware with an assigned location.

The fixed communication device 203 may include a software application related to or affiliated with the smart card 201 and/or a web browser to view data received from the network connection. The software application or web browser may be configured to operate on a portable communication device, such as portable communication device 202; alternatively, the software application or web browser may be configured to operate on a device with more system resources. The contactless communication interface may be any short-range wireless communication interface, such as near field communication (NFC) and radio-frequency identification (RFID). In an embodiment, the contactless communication interface may be a NFC interface compliant with the ISO 18092/ECMA-340 standard. This contactless communication interface may allow data communication with the smart card 201, when the smart card 201 is within the interface's communication field. When the smart card 201 is within data communication range of the fixed communication device 203, the smart card 201 may synchronize the value of the counter stored in its memory with the counter stored by the fixed communication device 203, and further, the smart card 201 may transmit a unique URL to the fixed communication device 203. In an embodiment, the fixed communication device 203 may be installed in a commercial establishment, such as a store, restaurant, office, or other work site.

The smart card 201 may generate the unique URL upon synchronizing the value of the counter stored in its memory with the value of the counter stored on the fixed communication device 203. The smart card 201 may append tags to the unique URL to provide additional information to the communication devices 202, 203 and the server 204. The tags may include a customer identifier, such as the customer identifier 110 discussed with reference to FIG. 1.

In an embodiment, the portable communication device 202 may have location functionality through which the device may determine its current geographic location. For example, the portable communication device 202 may determine its location using the Global Positioning System (GPS) or based on its wireless data connection (e.g., a nearby cellular tower or a wireless internet router). The portable communication device 202 may append location information to the URL prior to sending the URL to the server 204.

The portable communication device 202 may append information relating to itself to the unique URL prior to sending the URL to the server 204. For example, the portable communication device 202 may append information relating to the brand or model of the device or its operating system. For example, the portable communication device 204 may append an identifier relating to the user of the device, an identifier relating to the registered owner of the device, or information identifying the device itself or relating to its operation, such as operating system information. In an embodiment, the portable communication device 202 may be a smart phone containing a subscriber identity module (SIM) card, the portable communication device 202 may append the international mobile subscriber identity number to the URL.

Similarly, the fixed communication device 203 may append information relating to itself to the unique URL prior to sending the URL to the server 204. Like the portable communication device 202, the fixed communication device may append information identifying the device or its operating system. In addition, given its stationary nature, the fixed communication device 203 may possess information specific to its location. For example, if the fixed communication device 203 is placed at an electronics store, information identifying the store and its characteristics may be appended to the unique URL. In an embodiment, this information and location information may be transmitted to the server 204 through the unique URL to identify the specific electronics store, products available, or current promotions or rewards. In another embodiment, the fixed communication device 203 may have access to store records, such as a loyalty program or special offers, and this information may be transmitted to the server 204.

The server 204 may be in data communication with a plurality of communication devices, including portable communication device 202 and fixed communication device 203. This data communication may be accomplished by a network, such as the Internet, via a wireless communication network, a cellular network, a wide area network, a local area network, a wireless personal area network, a wide body area network, or the like, or any combination thereof. Using this data connectivity, the server 204 may synchronize the value of a counter stored in its memory with the counters stored in the communication devices 202, 203, receive a unique URL from the communication devices 202, 203, and transmit information in response to the unique URL.

In an embodiment, the server 204 may also receive and interpret identification information for the devices 202, 203. For example, the portable communication device 202 may append information identifying itself or its user to the unique URL. Upon receipt of this information, the server 204 may compare the device identifying information to records for the smart card 201 or the account or user associated with the smart card 201 (which may be identified by the customer identifier). If the identification information matches the account information and records available to the server 204, the server 204 may transmit financial or other information to the portable communication device 202. If the identification information does not match, the server 204 may request that the user submit authentication information prior to the transmission of any data in response to the unique URL. The requested authentication may be passwords, security questions, swipe patterns, image recognition, driver's license scan, multifactor authentication, and biometric authentication (e.g., voice recognition, a fingerprint scan, a retina scan, and a facial scan, if the portable communication device 202 is configured to receive this input), or a combination thereof. For example, multifactor authentication may include requiring the user to retrieve and respond to, or obtain a code from, a text message sent to the smart card user's or registered phone number, an email to the user's registered email address, or notification sent to a software application installed by the smart card user. In another example, the telephone number, email address, and software application may be associated with the account affiliated with the smart card 201, not the smart card user. As another example, the server 204 may permit the user to choose one or more of the authentication methods supported by the portable communication device 202. If the requested authentication is not provided, or if the server 204 finds that the input authentication is incorrect, the server may decline to provide any information to the portable communication device 202.

For example, the portable communication device 202 may be a smart phone, and information identifying the smart phone user or the smart phone device (e.g., via telephone number, SIM card, or other means) may be appended to the unique URL sent to the server 204. If the user identification or the device identification provided by the portable communication device 202 match the smart card user or smart card account information, the server 204 may transmit information responsive to the unique URL to the portable communication device 202. If not, the server 204 may decline to transmit responsive information to the portable communication device 202 or may request additional authentication information to be input into the portable communication device 202 prior to sending any information. In an embodiment where the identifying information for the portable communication device 202 does not match the records available to the server 204 and where incorrect authentication information (or no authentication information) is provided, there may be an increased likelihood that the smart card 201 is in the possession of an unauthorized individual, and the smart card 201 may have been lost or stolen. By declining to send information to the portable communication device 202, the server 204 may have prevented the commission of a fraud or an identity theft.

In an embodiment, the fixed communication device 203 may support similar authentication methods as the portable communication device 202. In addition, the fixed communication device 203 may allow for other authentication methods. For example, the fixed communication device 203 may be placed at an information kiosk or checkout register at a store or other commercial location where store employees are supervising. In this case, the user may be required to show photo identification to an employee. If proper identification is presented, the store employee may enter a code, scan a badge, or otherwise indicate to the fixed communication device 203 that proper identification has been shown.

In an embodiment, the sensitivity of the information requested may also determine whether the server requires additional authentication. For example, if the unique URL requests an account balance or credit score, the server may require additional authentication from the user prior to transmitting this information to the communication device. As another example, if the unique URL requests information about a reward or loyalty program, the server may not require further authentication.

In an embodiment, the URL may be unique to this information request, and may be based in part on the value of the counter and the customer information stored in the smart card's memory. The synchronization of counter values between the smart card 201, the communication devices 202, 203, and the server 204 may facilitate the uniqueness of the URL. For example, the URL may include pseudo-random or quasi-random elements, which may be based on the counter value, the customer identification, or other value known between all devices, or a combination thereof. As another example, a unique URL may be formed by cryptographically hashing the customer identification and the counter value, and the hash may be included as part of the unique URL. The server 204 may recreate the hash with the expected value of the counter, and if there is a match, the server 204 may determine that there has been a successful authentication, and the user may be permitted to access data. In addition, the information request may be the only time this particular URL is used, and subsequent requests may generate different URLs. This may be true even if the same information is requested multiple times. The use of a disposable URL may increase security for the information request and may reduce the likelihood that an unauthorized user successfully requests data access. In an embodiment, the smart card 201 may generate a series of unique URLs to request or communicate subsequent information to the communication devices 202, 203 and server 204.

As another example, the server 204 may have access to a user's account setting and transaction history. If suspicious activity, potential fraud, or an unusual frequency or magnitude of purchases was detected, the server 204 could seek additional authentication before providing further account information. In another embodiment, the smart card 201 may determine if additional authentication is needed, and may generate a unique URL making that request.

In an embodiment, the functions of the server 204 may be performed by a plurality of servers connected by a network. These servers may communication through the Internet or other network, and are not required to be in any geographic proximity to the smart card 201 or the communication devices 202, 203. The server 204 may also communicate with servers outside of the system depicted in FIG. 2, such as servers belong to commercial or other entities in order or obtain, provide, or verify information.

FIG. 3 is a flow chart diagramming a method of providing secure data access using a smart card according to an example embodiment. The secure data access method 300 commences at step 305 when the smart card enters the communication field of a portable or fixed communication device. In step 310, upon entry into the communication field, the smart card increments the value of the counter stored in its memory, and in step 315, the smart card synchronizes this value with the counter stored on the communication device. Then, in step 320, the smart card may generate a unique URL, which may indicate the information requested, along with the counter value and the customer identification. In an embodiment, the smart card may append location information, device-specific information, or user-specific information in the URL, and potentially other information relevant to the request.

Upon generation of the unique URL, the smart card may transmit the URL, via its contactless communication interface, to the communication device in step 325, and the URL may be stored in the memory of the communication device. Upon receipt of the unique URL, the communication device may synchronize the value of its counter with the counter stored by the server in step 330 and accordingly, the server will have the value of the counter used to create the unique URL. Further, the communication device may append additional information, such as information identifying itself or its location, to the unique URL prior to sending the URL to the server. Once this is complete, the communication device may transmit the unique URL to the server in step 335.

Upon receipt of the unique URL, in step 340 the server determines whether the information requested is sufficiently sensitive to require additional authentication. If the server determines that no further authentication is required, the "NO" choice is made in step 345, and the server transmits the requested information to the communication device (step 350) for display to the user (step 360).

Alternatively, if the server determines that additional information is needed, the "YES" choice is made in step 345 and the communication device prompts the user to provide additional authentication in step 360. If the user fails to provide sufficient authentication, the "NO" choice is made at step 365 and the server declines to transmit information to the communication device (step 370). If sufficient authentication is provided, the "YES" choice is made at step 365, the server transmits the requested information to the communication device (step 375) for display to the user (step 380).

Figure 4A:
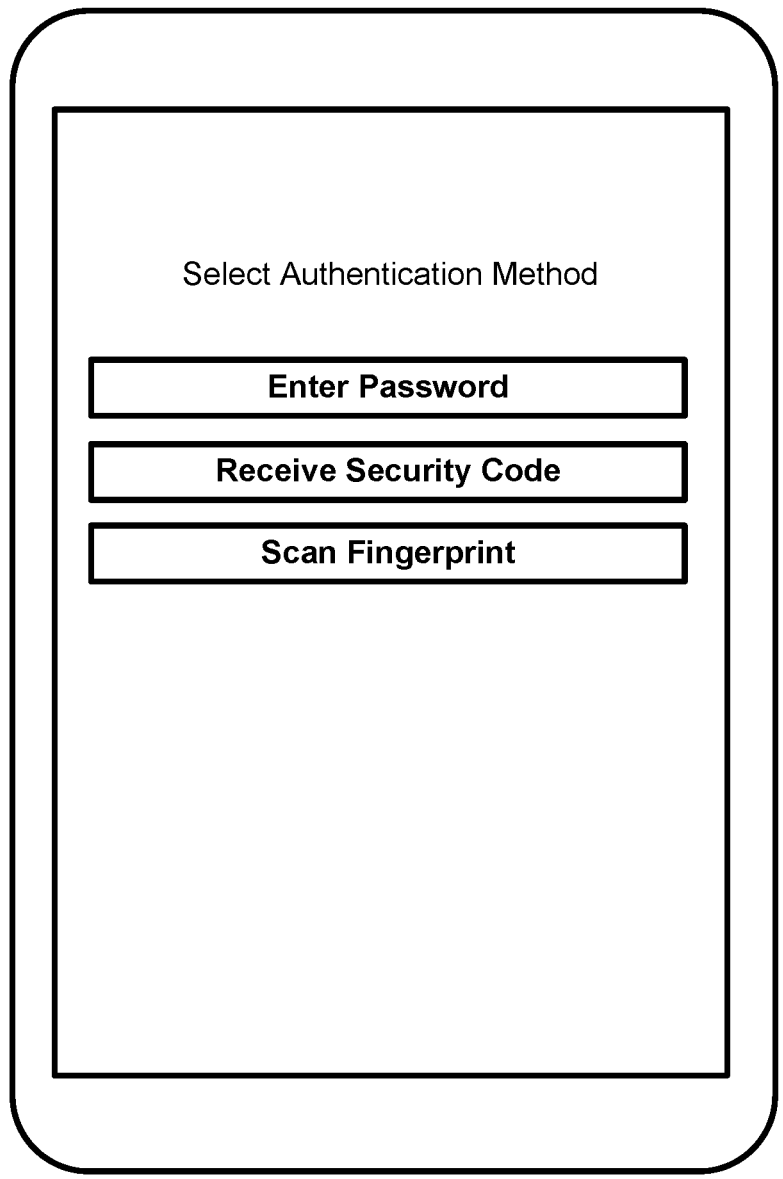
FIG. 4A illustrates an example embodiment of an authentication selection user interface displayed by a software application.
Figure 4B:
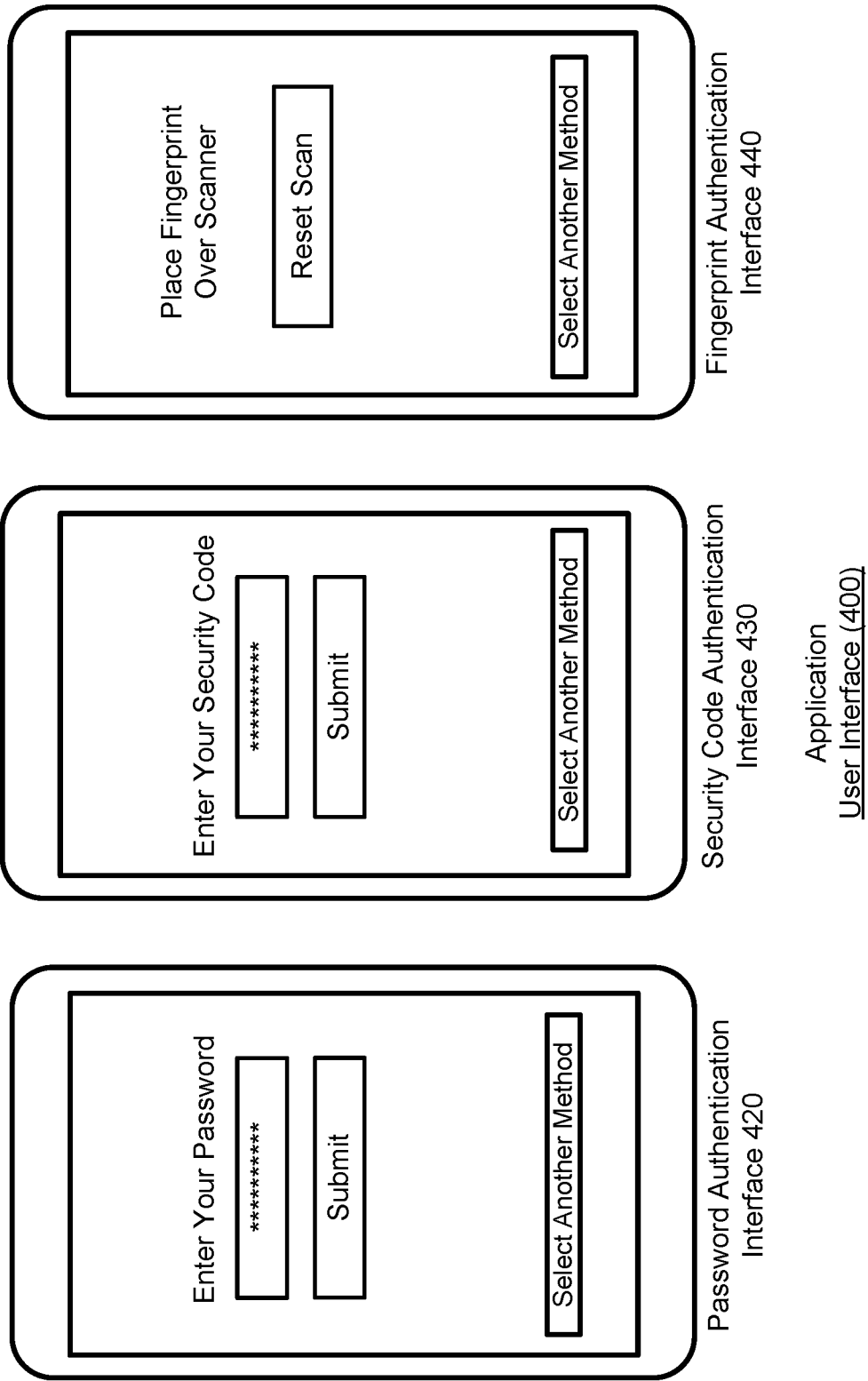
FIG. 4B illustrates an example embodiment of authentication user interfaces displayed by a software application.
Figure 4C:
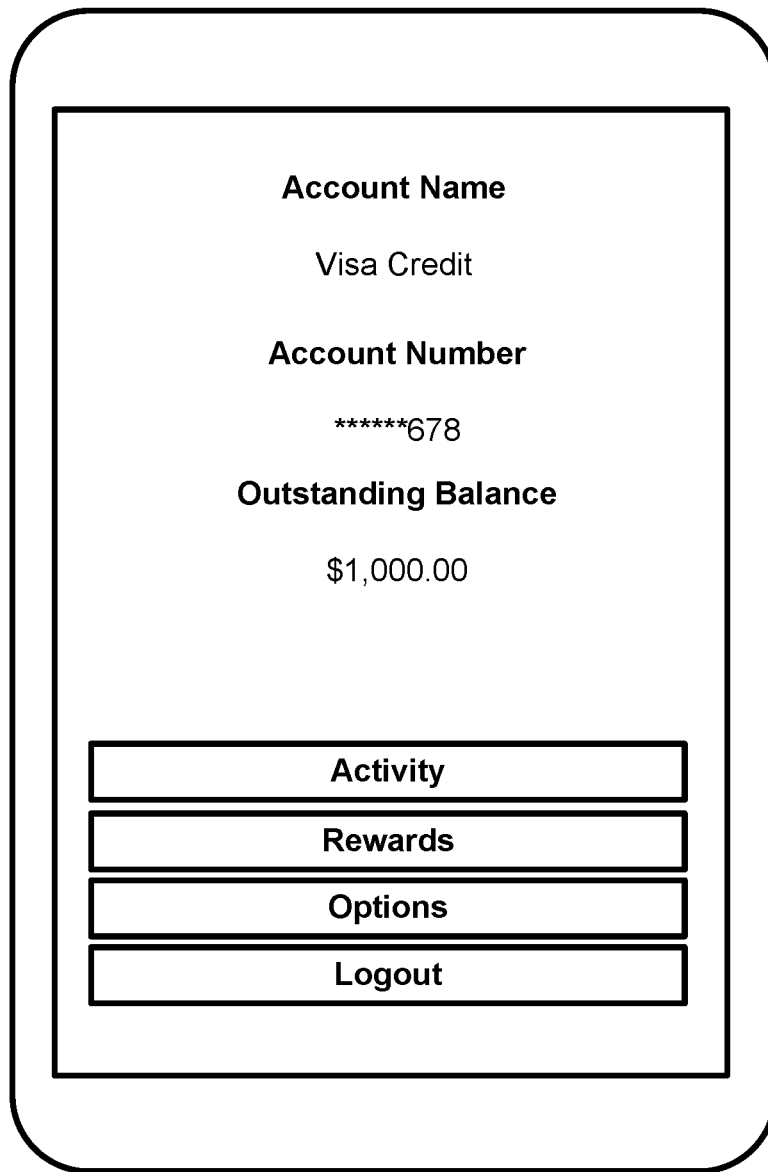
FIG. 4C illustrates an example embodiment of an information user interface displayed by a software application.

FIGS. 4A, 4B, and 4C illustrate authentication and account information user interfaces displayed on a software application according to example embodiments. The software application may be designed for use on both portable and fixed communication devices and may be optimized for use on each device. It is understood that the interfaces illustrated in FIGS. 4A, 4B, and 4C are exemplary, and the information that may be displayed is not limited thereto.

As shown in FIG. 4A, the application may display an authentication method selection interface 410. This interface may be shown if the server determines that, upon opening of the unique URL by the software application, additional authentication is required to view the requested information. Authentication method selection interface 410 may list the authentication methods supported by the application, communication device, and server, including the methods previously discussed, for which authenticating information is available. As shown in FIG. 4A, these methods include entering a password, receiving a security code, and scanning a fingerprint.

FIG. 4B illustrates several authentication user interfaces. Password authentication interface 420 requires the user to enter a password prior to the display of any information by the application. Security code authentication interface 430 requires the entry of a security code, which may be sent via email to the user's registered email address or via text message to the user's registered telephone number. Fingerprint authentication interface 440 requires the user to place a finger over a fingerprint scanner (not shown in FIG. 4B). Each of these interfaces allows the user to select another method authentication by pressing the button at the bottom of the interface. If pressed, the button may return the user to the authentication method selection interface 410. The authentication information submitted through these interfaces may be transmitted to the server for verification, and if the user is successfully authenticated, the user may view the account interface 450 shown in FIG. 4C. If the user is not successfully authenticated, the software application may prompt the user to resubmit the information or choose another authentication method, may inform the user the information is not current accessible, or the application may close. It is understood that the authentication interfaces 420, 430, 440 are merely exemplary, and the information available for viewing in the web browser is not limited what is illustrated in FIG. 4B.

FIG. 4C illustrates the account interface 450, which is displayed if the user is successfully authenticated. The account interface 450 may display information relating to the account associated with the smart card. As shown in FIG. 4C, a credit card account is displayed, and relevant information for this account, including name, account number, and outstanding balance are shown. In addition, the user may choose to view further information regarding account activity, rewards, and account options by choosing from the buttons listed at the bottom of account interface 450. Once the user is finished, the user may end the browsing session by logging out of the account using the logout button.

FIG. 5 illustrates authentication and account information user interfaces displayed on a web browser according to example embodiments. It is understood that the interfaces illustrated in FIG. 5 are exemplary, and the information that may be displayed is not limited thereto.

In an embodiment, the authentication interface 510 may be displayed if, in response to the web browser opening the unique URL, the server determines that additional authentication is required to view the requested information. As shown in FIG. 5, the authentication interface 510 may receive a user name or password as authentication. Alternatively, the authentication interface 510 may require only a password. In addition, the authentication interface 510 may give the user the option to select another method of authentication. These methods may include any other authentication methods supported by the web browser, the communication device, and the server, including the methods previously discussed, for which authenticating information is available.

Upon entry of this information, the web browser communicates with the server to verify the submitted information. If the user is successfully authenticated, the account interface 520 may be displayed. The account interface 520 may display information relating to the account associated with the smart card. In the embodiment illustrated in FIG. 5, a credit card account is displayed, and relevant information for this account, including name, account number, and outstanding balance are shown. In addition, the user may choose to view further information regarding account activity, rewards, and account options by choosing from the buttons listed at the bottom of account interface 520. It is understood that the authentication interface 510 and the interface 520 are merely exemplary, and the information available for viewing in the web browser is not limited what is illustrated in FIG. 5. Once the user is finished, the user may end the browsing session by logging out of the account using the logout button. If the user is not successfully authenticated, the web browser may prompt the user to resubmit the information or choose another authentication method, may inform the user that their information is not currently accessible, or the browser may close.

The interfaces of the foregoing embodiments may be formatted, for example, as web pages in HyperText Markup Language (HTML), Extensible Markup Language (XML) or in any other suitable form for presentation on the communication device. The form and formatting may be dependent upon applications used by users to interact with the device and the system resources available to the device. The user may use any device for entering information into the communication devices that is available and supported by the devices, including a touch screen, virtual keyboard, cursor-control device, stylus, voice recognition.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. An information access system, comprising:
a server storing a server counter; and
a smart card comprising a microprocessor, a communication interface, and a memory storing an applet, a card counter, and a customer identifier, wherein the microprocessor is configured to:
increment the card counter,
transmit the incremented card counter via the communication interface for synchronization with the server,
generate a unique one-time uniform resource locator (URL) by cryptographically hashing the incremented value of the card counter and the customer identifier, and
transmit the unique one-time URL via the communication interface; and
wherein, upon receipt of the incremented card counter, the server is configured to synchronize the incremented card counter and the server counter.

2. The information access system of claim 1, wherein the cryptographic hash is included in the URL.

3. The information access system of claim 1, wherein a communication field is generated by a communication device comprising a microprocessor and a memory storing an application comprising instructions for execution by the microprocessor.

4. The information access system of claim 3, wherein:
the application receives the unique one-time URL from the smart card via the communication field and transmits the unique one-time URL to the server,
the server recreates the cryptographic hash using the incremented counter value, and
the server compares the recreated cryptographic hash to the received unique one-time URL for authentication.

5. The information access system of claim 4, wherein upon a successful comparison, the server transmits financial information to the application.

6. The system for the secure access of information of claim 5, wherein prior to sending financial information to the application, the server requests entry of authentication information on the application.

7. The information access system of claim 4, wherein the application appends device identification information to the unique one-time URL prior to transmitting the unique one-time URL to the server.

8. The information access system of claim 4, wherein the application appends location information to the unique one-time URL prior to transmitting the unique one-time URL to the server.

9. The information access system of claim 4, wherein the application appends user identification information to the unique one-time URL prior to transmitting the unique one-time URL to the server.

10. The information access system of claim 1, wherein the unique one-time URL requests at least one selected from the group of an account balance, a credit score, and a product availability.

11. The information access system of claim 10, wherein, upon determining that the unique one-time URL requests an account balance or a credit score, the server requests additional authentication information.

12. A method for information access using a smart card comprising a communication interface, a microprocessor, and a memory storing an applet, a card counter, and a unique customer identifier, the method comprising the steps of:
upon entering a communication field of a communication device comprising a microprocessor and a memory storing an application comprising instructions for execution by the microprocessor, incrementing the card counter;
transmitting the incremented card counter for synchronization via the communication interface;

generating a unique one-time uniform resource locator (URL) by cryptographically hashing the incremented value of the card counter and the customer identifier; and transmitting the unique one-time URL via the communication interface.

13. The method for information access of claim 12, wherein the unique customer identifier identifies an account assigned to the smart card.

14. The method for information access of claim 12, wherein:
the incremented card counter is transmitted to a server storing a server counter, and
the server is configured to synchronize the incremented card counter with the server counter.

15. The method for information access of claim 14, further comprising:
recreating, by the server, the cryptographic hash using an expected server counter value and the unique customer identifier;
comparing, by the server, the recreated cryptographic hash to the unique one-time URL; and
transmitting, by the server, financial information to the application if the recreated cryptographic hash matches the unique one-time URL.

16. The method for information access of claim 12, further comprising appending, by the application, location information to the URL.

17. The method of accessing of information of claim 16, further comprising receiving location-specific data from the server in response to the appended location information.

18. The method of accessing of information of claim 12, further compromising appending information identifying the communication device to the unique one-time URL before transmitting the unique one-time URL to the server.

19. The method of accessing of information of claim 18, wherein upon review of the information identifying the communication device appended to the unique one-time URL by the server, requesting additional authentication information prior to transmitting financial information from the server to the communication device.

20. A non-transitory computer-accessible medium having stored thereon computer-executable instructions for providing information access, wherein, when a computer arrangement comprising a communication interface, a microprocessor, and a memory storing an applet, a card counter, and a unique customer identifier, executes the instructions, the computer arrangement is configured to perform procedures comprising:

incrementing the card counter;

transmitting the incremented card counter for synchronization via the communication interface;

generating a unique one-time uniform resource locator (URL) by cryptographically hashing the incremented value of the card counter and the customer identifier; and transmitting the unique one-time URL via the communication interface.

* * * * *